US009454043B2

(12) United States Patent
Park et al.

(10) Patent No.: US 9,454,043 B2
(45) Date of Patent: Sep. 27, 2016

(54) DISPLAY DEVICE AND METHOD OF MANUFACTURING THE SAME

(71) Applicant: Samsung Display Co., Ltd., Yongin, Gyeonggi-do (KR)

(72) Inventors: Yong-Han Park, Hwaseong-si (KR); Dongho Lee, Suwon-si (KR); Young-Cheol Jeong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 77 days.

(21) Appl. No.: 14/594,013

(22) Filed: Jan. 9, 2015

(65) Prior Publication Data

US 2015/0261029 A1  Sep. 17, 2015

(30) Foreign Application Priority Data

Mar. 11, 2014 (KR) .................. 10-2014-0028447

(51) Int. Cl.
*G02F 1/1339* (2006.01)
*G02F 1/1337* (2006.01)
*G02F 1/1333* (2006.01)
G02F 1/1343 (2006.01)

(52) U.S. Cl.
CPC ..... *G02F 1/13394* (2013.01); *G02F 1/133305* (2013.01); *G02F 2001/134345* (2013.01)

(58) Field of Classification Search
CPC .............. G02F 1/13394; G02F 1/133377; G02F 1/133512; G02F 1/133707; G02F 1/1339; G02F 1/133392; G02F 1/1341; G02F 2001/13415; G02F 1/1393; G02F 2001/133742
USPC .................. 349/156, 155, 190, 130
See application file for complete search history.

(56) References Cited

U.S. PATENT DOCUMENTS 8,023,092 B2 * 9/2011 Tatemori ............ G02F 1/13394
349/156
2015/0116621 A1 * 4/2015 Park ............... G02F 1/133305
349/43

FOREIGN PATENT DOCUMENTS

| JP | 2004-029487 A | 1/2004 |
| JP | 2007-333818 A | 12/2007 |
| JP | 2008-112001 A | 5/2008 |
| JP | 2010-190997 A | 9/2010 |
| KR | 10-2006-0070873 A | 6/2006 |
| KR | 10-2009-0000947 A | 1/2009 |
| KR | 10-2010-0021021 A | 2/2010 |
| KR | 10-2011-0062847 A | 6/2011 |
| KR | 10-1069250 B1 | 10/2011 |
| KR | 10-1097610 B1 | 12/2011 |

* cited by examiner

*Primary Examiner* — Mike Qi
(74) *Attorney, Agent, or Firm* — Lewis Roca Rothgerber Christie LLP

(57) ABSTRACT

A display device includes a display substrate with a pixel and being curved along a first direction, an opposite substrate facing the display substrate, being coupled to the display substrate, and curved with the display substrate, a column spacer disposed between the display substrate and the opposite substrate to maintain a gap between the display substrate and the opposite substrate and including first and second spacers respectively disposed at left and right sides of a center line passing through a center portion of the display substrate along a second direction substantially normal to the first direction, a first misalignment preventing layer disposed at a left side of the first spacer with respect to the center line, and a second misalignment preventing layer disposed at a right side of the second spacer with respect to the center line.

20 Claims, 18 Drawing Sheets

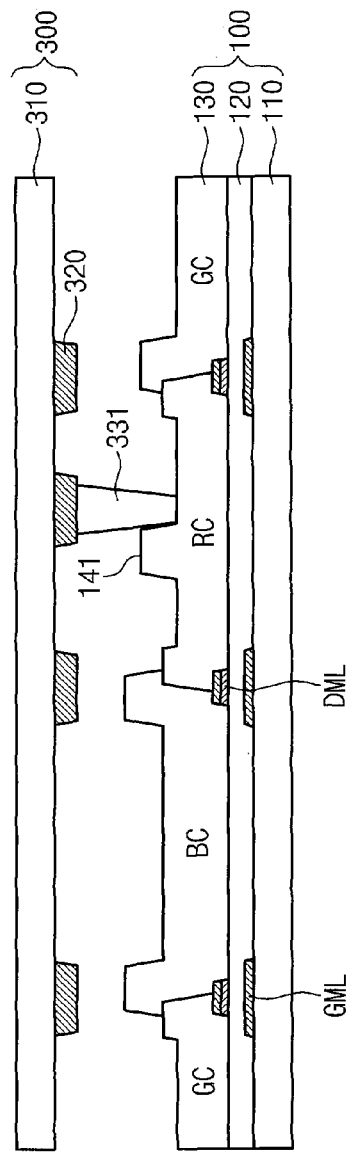
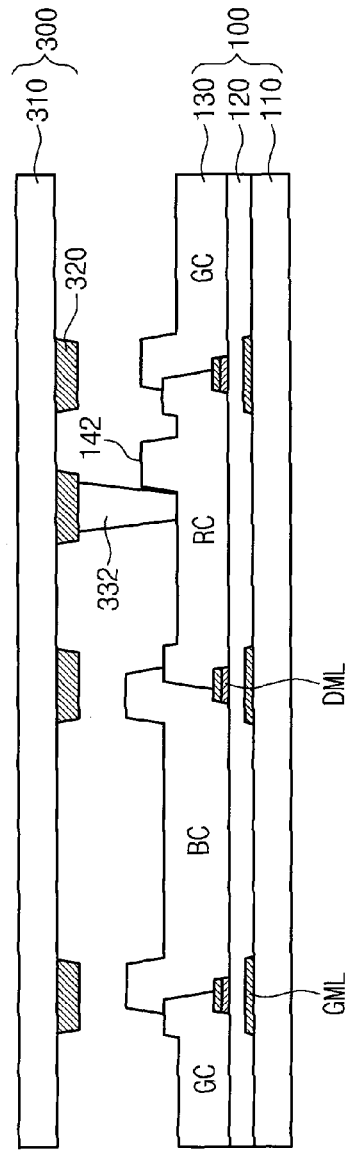

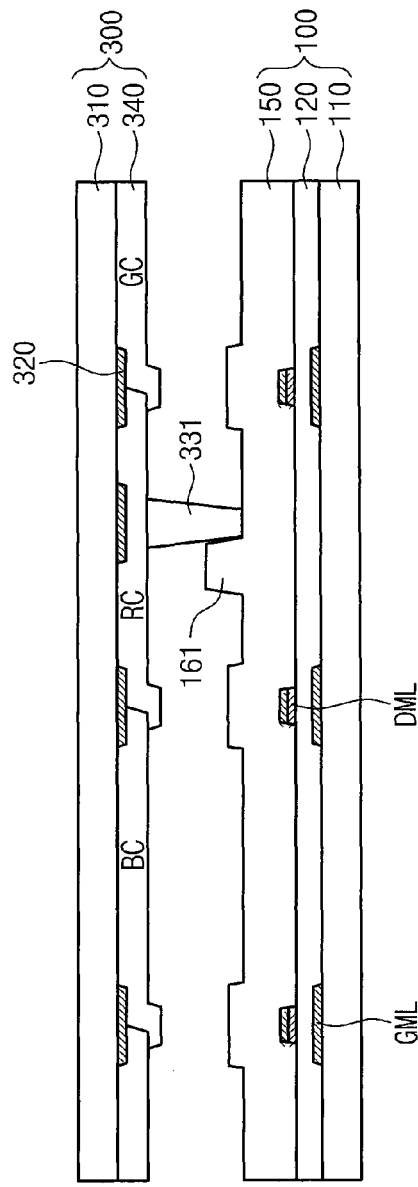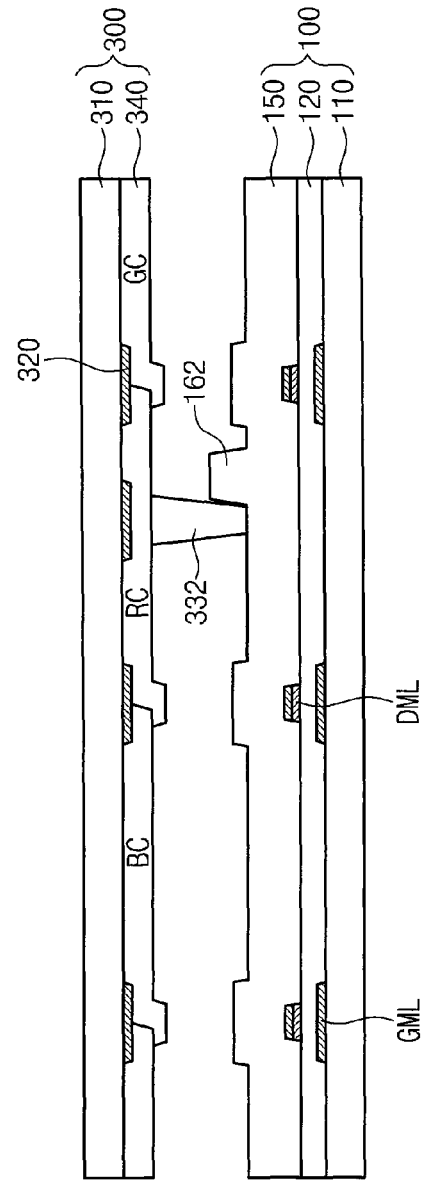

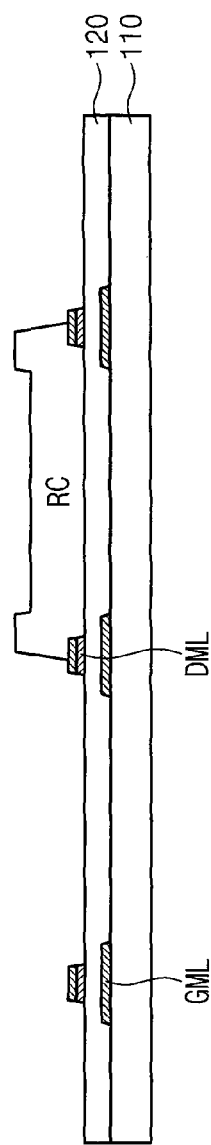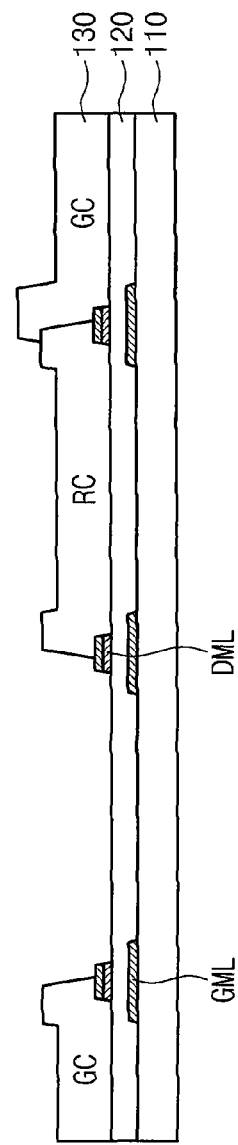

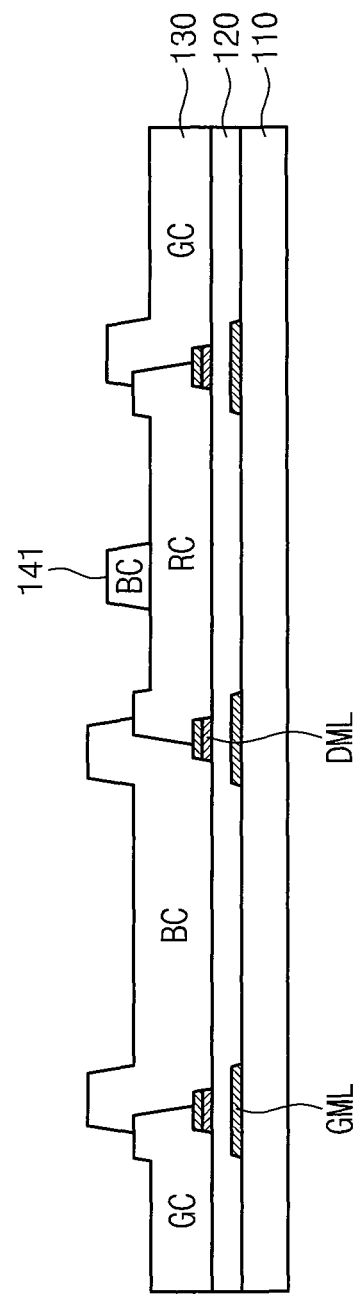

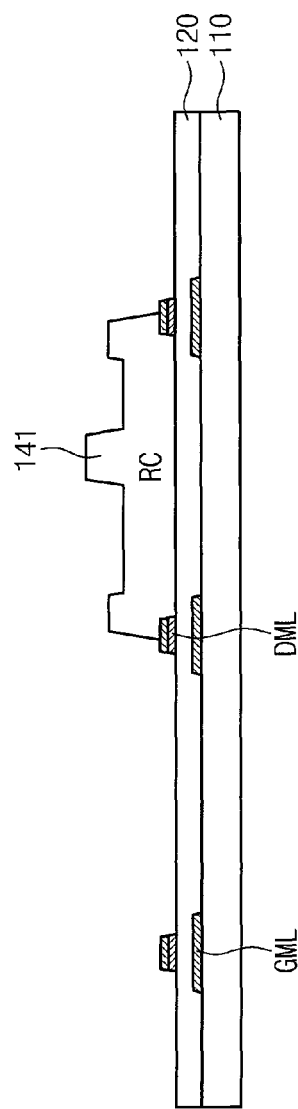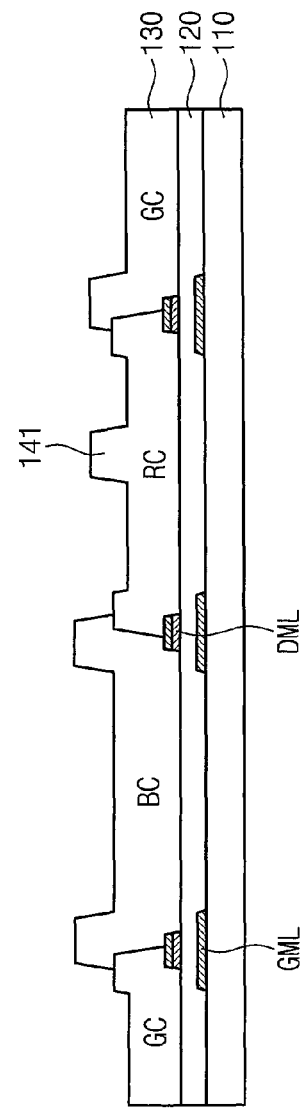

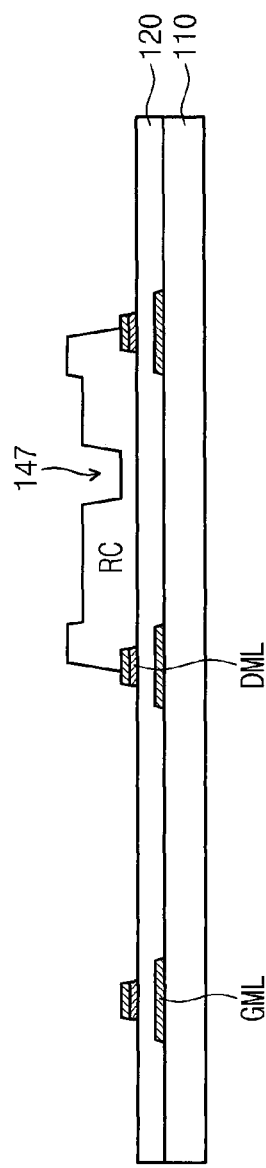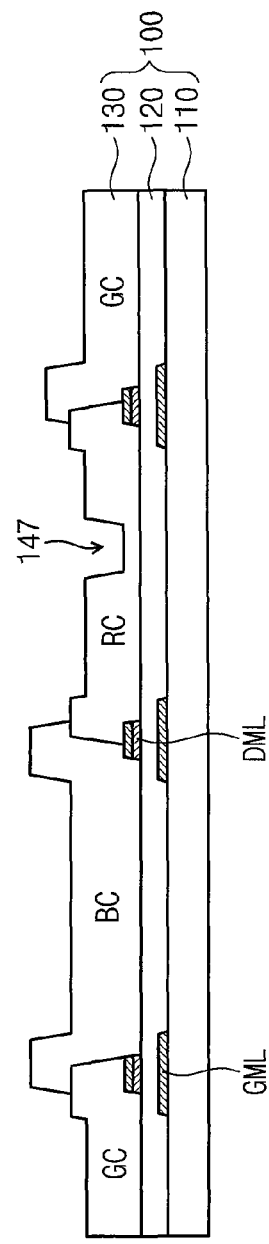

FIG. 15
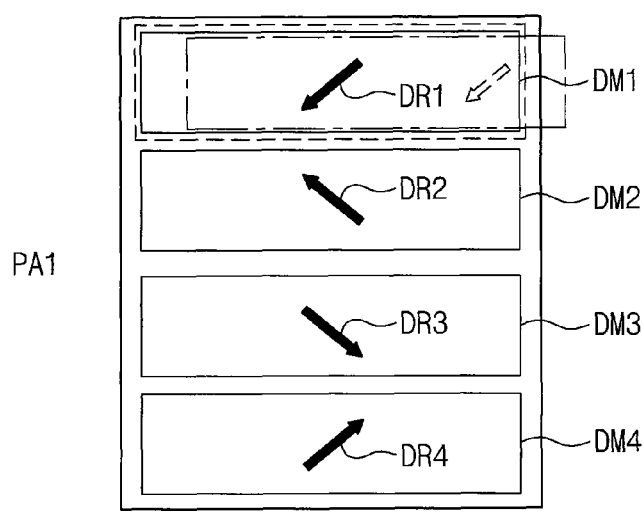
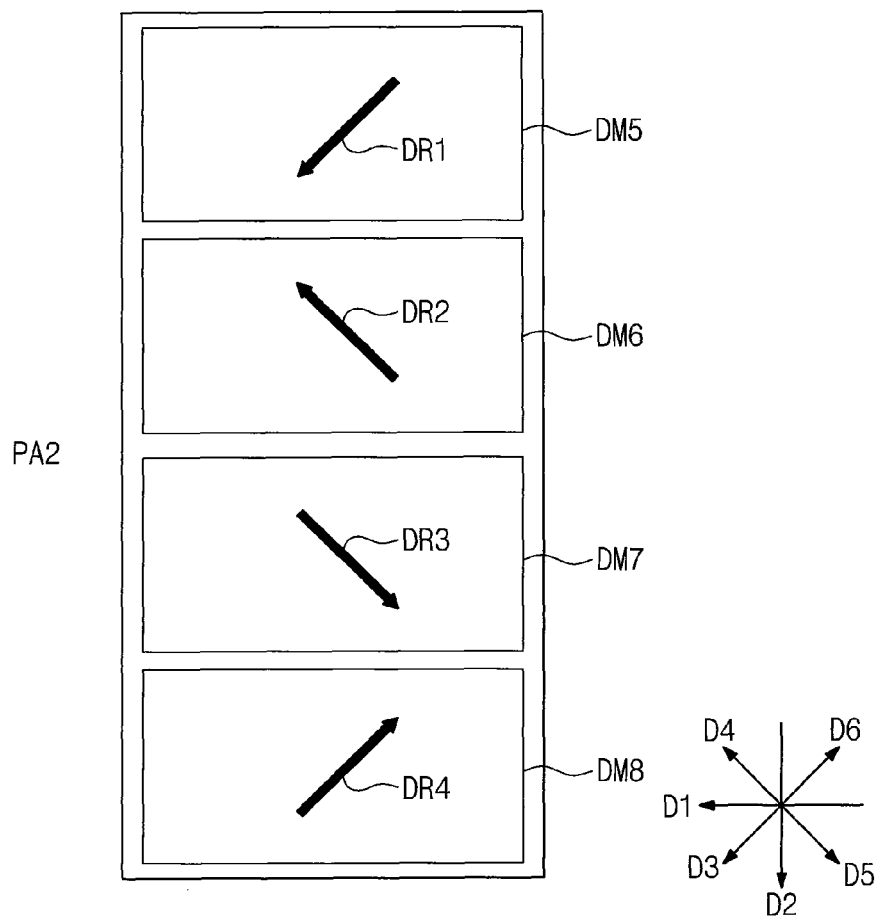

DISPLAY DEVICE AND METHOD OF MANUFACTURING THE SAME

CROSS-REFERENCE TO RELATED APPLICATION

This application claims priority to and the benefit of Korean Patent Application No. 10-2014-0028447, filed on Mar. 11, 2014, the content of which is hereby incorporated by reference in its entirety.

BACKGROUND

1. Field

The present disclosure relates to a display device and a method of manufacturing the same. More particularly, the present disclosure relates to a display device having a curved shape and a method of manufacturing the display device.

2. Description of the Related Art

A liquid crystal display includes two transparent substrates and a liquid crystal layer disposed between the two transparent substrates. The liquid crystal display drives liquid crystal molecules of the liquid crystal layer to control a light transmittance in each pixel, thereby displaying a desired image.

Among various operation modes of the liquid crystal display, in a vertical alignment mode liquid crystal display, the liquid crystal molecules of the liquid crystal layer are vertically (e.g., normally) aligned with respect to the two substrates when an electric field is formed between the two substrates, and the vertically aligned liquid crystal molecules transmit the light, to thereby display the image. The vertical alignment mode liquid crystal display includes liquid crystal domains required to align the liquid crystal molecules in different directions to improve a viewing angle of the liquid crystal display.

In recent years, a curved liquid crystal display has been developed. The curved liquid crystal display provides a user with a curved display panel, and thus the curved liquid crystal display provides the image having improved three-dimensional effect, immersiveness, and presence to the user.

SUMMARY

Aspects of embodiments of the present disclosure are directed toward a display device capable of preventing a misalignment between upper and lower substrates in a curved shape to improve a display quality thereof.

Aspects of embodiments of the present disclosure are directed toward a method of manufacturing the display device.

Embodiments of the inventive concept provide a display device including a display substrate with a pixel and being curved along a first direction, an opposite substrate facing the display substrate, being coupled to the display substrate, and curved with the display substrate, a column spacer disposed between the display substrate and the opposite substrate to maintain a gap between the display substrate and the opposite substrate and including first and second spacers respectively disposed at left and right sides of a center line passing through a center portion of the display substrate along a second direction substantially vertical to the first direction, a first misalignment preventing layer disposed at a left side of the first spacer with respect to the center line, and a second misalignment preventing layer disposed at a right side of the second spacer with respect to the center line.

Embodiments of the inventive concept provide a method of manufacturing a display device, including forming a display substrate with a pixel disposed thereon, forming an opposite substrate including a column spacer, coupling the display substrate to the opposite substrate such that the column spacer is disposed between the display substrate and the opposite substrate to complete a display panel, and bending the display panel in a first direction to complete a curved display device. The column spacer includes first and second spacers respectively disposed at left and right sides of a center line passing through a center portion of the display substrate along a second direction substantially vertical (e.g., normal or perpendicular) to the first direction.

In one embodiment, the forming of the display substrate includes forming a first misalignment preventing layer disposed at a left side of the first spacer with respect to the center line and a second misalignment preventing layer disposed at a right side of the second spacer with respect to the center line.

According to the above and embodiments of the present disclosure, the curved display device includes the misalignment preventing layer engaged with the column spacer to prevent the misalignment between the display substrate and the opposite substrate. Therefore, a stress applied to the curved display panel, which is caused by bending the display panel, may be blocked by an engaging force between the misalignment preventing layer and the column spacer. As a result, the misalignment between the display substrate and the opposite substrate, which is caused by the variation in position of the column spacer, may be prevented.

In addition and according to embodiments of the present disclosure, since the misalignment preventing layer is formed without performing additional processes, the number of the manufacturing processes of the curved display device may be prevented from being increased.

BRIEF DESCRIPTION OF THE DRAWINGS

The above and other advantages of the present disclosure will become readily apparent by reference to the following detailed description when considered in conjunction with the accompanying drawings wherein:

FIG. 7A is a cross-sectional view showing a first area according to an exemplary embodiment of the present disclosure;

FIG. 7B is a cross-sectional view showing a second area according to an exemplary embodiment of the present disclosure;

FIG. 9A is a cross-sectional view showing a first area according to an exemplary embodiment of the present disclosure;

FIG. 9B is a cross-sectional view showing a second area according to an exemplary embodiment of the present disclosure;

FIGS. 11A to 11C are cross-sectional views showing a manufacturing method of a display substrate according to an exemplary embodiment of the present disclosure;

FIGS. 12A to 12C are cross-sectional views showing a manufacturing method of a display substrate according to an exemplary embodiment of the present disclosure;

FIGS. 13A to 13C are cross-sectional views showing a manufacturing method of a display substrate according to an exemplary embodiment of the present disclosure;

FIG. 15 is a view showing domains defined in a pixel area and liquid crystal alignment directions.

DETAILED DESCRIPTION

Figure 1:
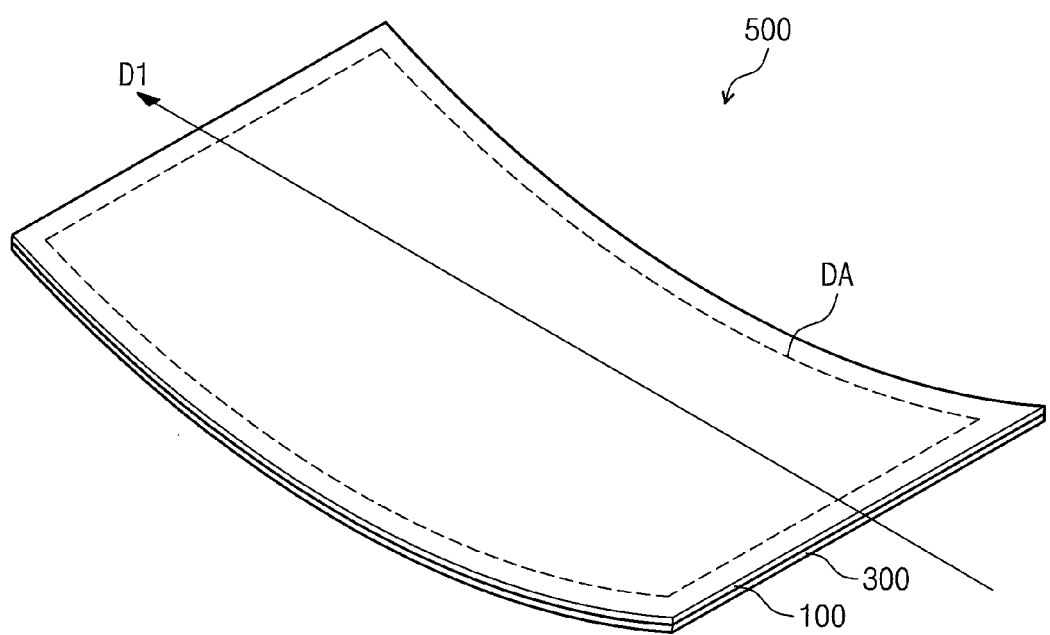
FIG. 1 is a perspective view showing a curved display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in more detail with reference to the accompanying drawings.

FIG. 1 is a perspective view showing a curved display device 500 according to an exemplary embodiment of the present disclosure.

Referring to FIG. 1, the curved display device 500 includes a display area DA in which an image is displayed and has a curved shape. Accordingly, the curved display device 500 displays the image having improved three-dimensional effect, immersiveness, and presence with the display area DA having the curved shape.

In the present exemplary embodiment, the curved display device 500 includes a display substrate 100, an opposite substrate 300, and a liquid crystal layer. The opposite substrate 300 faces the display substrate 100 while being coupled to the display substrate 100, and the liquid crystal layer is interposed between the display substrate 100 and the opposite substrate 300.

The curved display device 500 may further include other components besides the display substrate 100 and the opposite substrate 300. For instance, the curved display device 500 may further include a backlight assembly that provides light to the display substrate 100 and the opposite substrate 300, but the structure of the curved display device 500 should not be limited to the above-mentioned structure including the backlight assembly.

In the present exemplary embodiment, the curved display device 500 is curved along a first direction D1 in a plane surface. Accordingly, a portion or all of the display substrate 100 has the curved shape along the first direction D1, and the display area DA has the curved shape along the first direction D1. In addition, the opposite substrate 300 has the curved shape corresponding to that of the display substrate 100.

Figure 2:
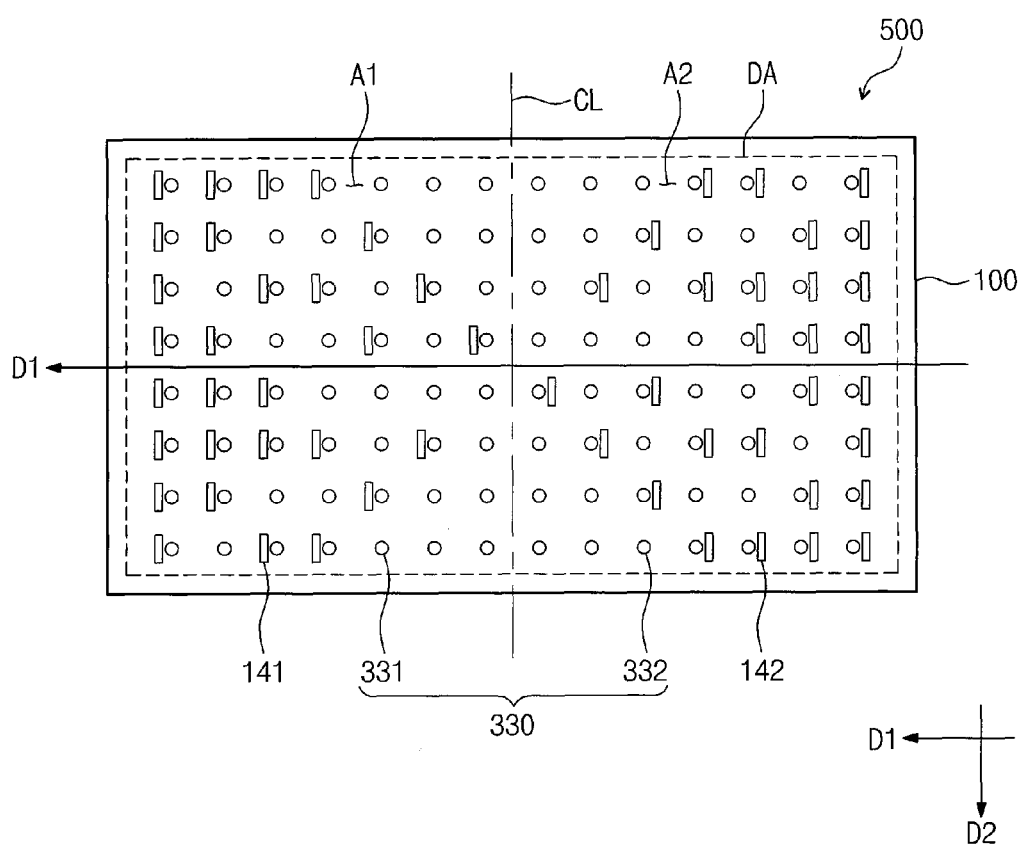
FIG. 2 is a plan view showing the curved display device shown in FIG. 1.

FIG. 2 is a plan view showing the curved display device shown in FIG. 1.

Referring to FIG. 2, the curved display device 500 includes first and second areas A1 and A2, which are divided with respect to a center line CL passing through a center portion of the curved display device 500 along a second direction D2 substantially vertical to the first direction D1. The first area A1 is located at a left side of the center line CL, and the second area A2 is located at a right side of the center line CL.

The curved display device 500 includes a column spacer 330 interposed between the display substrate 100 and the opposite substrate 300 to form a gap between the display substrate 100 and the opposite substrate 300. The column spacer 330 has a circular shape when viewed in a plan view and is uniformly distributed in the display area DA.

For the convenience of explanation, the column spacer 330 includes a first spacer 331 disposed in the first area A1 and a second spacer 332 disposed in the second area A2 according to a position thereof. Accordingly, the first and second spacers 331 and 332 have the same shape and function.

The curved display device 500 includes a first misalignment preventing layer 141 disposed adjacent to a left side of the first spacer 331 and a second misalignment preventing layer 142 disposed adjacent to a right side of the second spacer 332.

Each of the first and second misalignment preventing layers 141 and 142 has a bar shape extending in (along) the second direction D2. In the present exemplary embodiment, a density of the first misalignment preventing layer 141 increases as a distance from the center line CL increases and a distance to the left side of the display area DA decreases, and a density of the second misalignment preventing layer 142 increases as a distance from the center line CL increases and a distance to the right side of the display area DA decreases. The increase in density refers to (means) that the number of the first and second misalignment preventing layers 141 and 142 increases.

Although not shown in figures, as another embodiment, the first misalignment preventing layer 141 may be arranged in the first area A1 in a uniform density and the second misalignment preventing layer 142 may be arranged in the second area A2 in a uniform density.

Figure 3A:
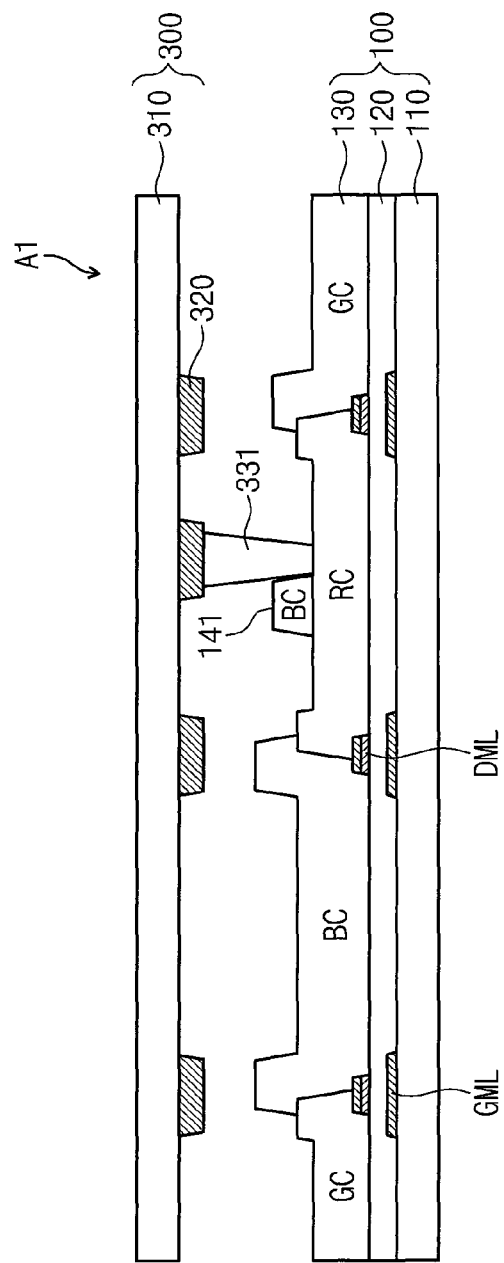
FIG. 3A is a cross-sectional view showing an area A1 shown in FIG. 2.
Figure 3B:
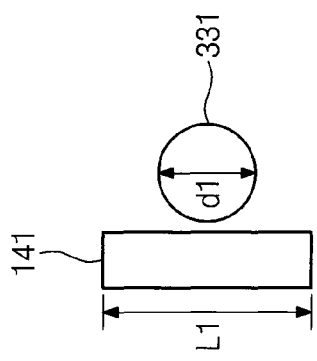
FIG. 3B is a plan view showing a first spacer and a first misalignment preventing layer shown in FIG. 3A.

FIG. 3A is a cross-sectional view showing an area A1 shown in FIG. 2, and FIG. 3B is a plan view showing a first spacer and a first misalignment preventing layer shown in FIG. 3A.

Referring to FIG. 3A, the display substrate 100 includes a first base substrate 110, a gate metal layer GML disposed on the first base substrate 110, a gate insulating layer 120 covering the gate metal layer GML, a data metal layer DML disposed on the gate insulating layer GML, and a color filter layer 130 covering the data metal layer DML.

The first base substrate 110 may be an insulating substrate having light transmitting and flexible properties, e.g., a plastic substrate. As another example, the first base substrate 110 may be a glass substrate. The gate metal layer GML includes a gate line and a gate electrode of a thin film transistor. The gate line is electrically connected to the gate electrode of the thin film transistor to apply a gate signal to the thin film transistor.

The gate insulating layer 120 is disposed on the first base substrate 110 to cover the gate metal layer GML. The gate insulating layer 120 includes an inorganic insulating material, e.g., silicon nitride, silicon oxide, etc.

The data metal layer DML is disposed on the gate insulating layer 120. The data metal layer DML includes a data line, a source electrode of the thin film transistor, and a drain electrode of the thin film transistor. The data line is insulated from the gate line while crossing the gate line, and the source electrode and the drain electrode are disposed above the gate electrode. Although not shown in figures, a semiconductor pattern may be further disposed between the gate electrode and the source and drain electrodes.

The color filter layer 130 includes a plurality of color filters RC, GC, and BC. As an example, the color filter layer 130 includes red, green, and blue color filters RC, GC, and BC.

The first misalignment preventing layer 141 is disposed in the first area A1 of the display substrate 100. The first misalignment preventing layer 141 is disposed on one of the red, green, and blue color filters RC, GC, and BC. In the present exemplary embodiment, the first misalignment preventing layer 141 is disposed on the red color filter RC and formed of the blue color filter BC.

According to another embodiment, the first and second misalignment preventing layers 141 and 142 may be formed on the color filters RC, GC, and BC using (utilizing) separate process and material rather than the color filters RC, GC, and BC.

The opposite substrate 300 includes a second base substrate 310 facing the first base substrate 110, a black matrix 320 disposed on the second base substrate 310, and the first spacer 331 disposed on the black matrix 320.

The second base substrate 310 may be an insulating substrate having light transmitting and flexible properties, e.g., a plastic substrate. The black matrix 320 includes a light blocking material and is disposed to correspond to at least one of the gate metal layer GML and the data metal layer DML.

The first spacer 331 is disposed on the black matrix 320 in the first area A1 of the opposite substrate 300. When the opposite substrate is coupled to the display substrate 100, the first spacer 331 makes contact with the display substrate 100, and thus the opposite substrate 300 is spaced apart from the display substrate 100 by a set or predetermined distance.

The display panel is curved in (along) the first direction D1 after the opposite substrate 300 is coupled to the display substrate 100, so that the display panel curved in (along) the first direction D1 is manufactured.

In this case, due to the gap between the display substrate 100 and the opposite substrate 300, a difference in curvature between the display substrate 100 and the opposite substrate 300 occurs and a misalignment is caused between the display substrate 100 and the opposite substrate 300.

One sidewall of the first misalignment preventing layer 141 makes contact with an end portion of the first spacer 331. Here, a stress applied to the curved display panel, which is caused by bending the display panel, may be blocked by an engaging force between the first misalignment preventing layer 141 and the first spacer 331. Accordingly, the misalignment between the display substrate 100 and the opposite substrate 300, which is caused by the stress, may be prevented.

As shown in FIG. 3B, the first misalignment preventing layer 141 is disposed adjacent to the one side of the first spacer 331. The first misalignment preventing layer 141 is formed in the shape of a bar (has a bar shape) extending in (along) the second direction D2 (refer to FIG. 2) to have a length L1 larger than a diameter d1 of the first spacer 331, but the shape of the first misalignment preventing layer 141 should not be limited thereto or thereby.

The distance between the first misalignment preventing layer 141 and the first spacer 331 is about 5 micrometers before the display panel is bent. Then, when the curved display panel is manufactured, the first misalignment preventing layer 141 is engaged with the first spacer 331 and the alignment between the display substrate 100 and the opposite substrate 300 may be maintained at about 5 micrometers or less by the engaging force between the first misalignment preventing layer 141 and the first spacer 331.

Figure 4A:
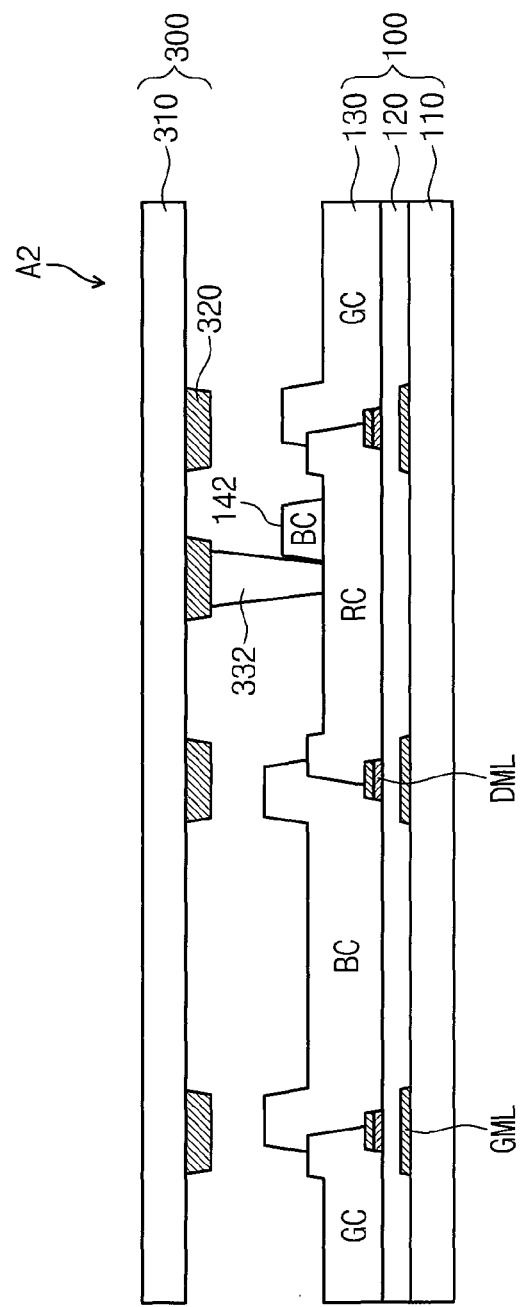
FIG. 4A is a cross-sectional view showing an area A2 shown in FIG. 2.
Figure 4B:
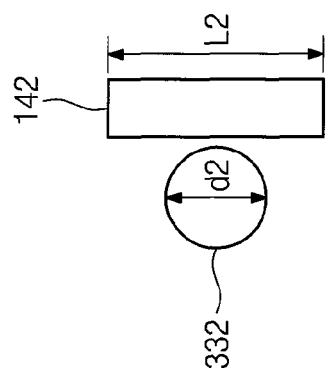
FIG. 4B is a plan view showing a second spacer and a second misalignment preventing layer shown in FIG. 4A.

FIG. 4A is a cross-sectional view showing an area A2 shown in FIG. 2, and FIG. 4B is a plan view showing a second spacer and a second misalignment preventing layer shown in FIG. 4A. In FIG. 4A, the same reference numerals denote the same elements in FIG. 3A, and thus detailed descriptions of the same elements will be omitted.

Referring to FIG. 4A, the color filter layer 130 includes a plurality of color filters RC, GC, and BC. As an example, the color filter layer 130 includes red, green, and blue color filters RC, GC, and BC.

The second misalignment preventing layer 142 is disposed in the second area A2 of the display substrate 100. The second misalignment preventing layer 142 is disposed on one of the red, green, and blue color filters RC, GC, and BC. In the present exemplary embodiment, the second misalignment preventing layer 142 is disposed on the red color filter RC and formed of the blue color filter BC.

The opposite substrate 300 includes the second spacer 332 disposed on the black matrix 320 in the second area A2. When the opposite substrate 300 is coupled to the display substrate 100, the second spacer 332 makes contact with the display substrate 100, and thus the opposite substrate 300 is spaced apart from the display substrate 100 by a set or predetermined distance.

The display panel is curved in the first direction D1 after the opposite substrate 300 is coupled to the display substrate 100, so that the display panel curved in the first direction D1 is manufactured.

In this case, one sidewall of the second misalignment preventing layer 142 makes contact with an end portion of the second spacer 332. Here, a stress applied to the curved display panel, which is caused by bending the display panel, may be blocked by an engaging force between the second misalignment preventing layer 142 and the second spacer 332. Therefore, the misalignment between the display substrate 100 and the opposite substrate 300, which is caused by the stress, may be prevented.

As shown in FIG. 4B, the second misalignment preventing layer 142 is disposed adjacent to the one side of the second spacer 332. The second misalignment preventing layer 142 has the bar shape extending in (along) the second direction D2 (refer to FIG. 2) to have a length L2 larger than a diameter d2 of the second spacer 332, but the shape of the second misalignment preventing layer 142 should not be limited thereto or thereby.

The first and second spacers 331 and 332 may have the same diameter d1 and d2, and in this case, the first and second misalignment preventing layers 141 and 142 may have the same length.

As shown in FIG. 2, when the display panel is curved along the first direction D1, the stress is increased as a distance between the center line CL and the left side and a distance between the center line CL and the right side is decreased. Thus, the number of the first misalignment preventing layers 141 is increased as the first misalignment preventing layers 141 get closer to the left side of the first area A1 from the center line CL and the number of the second misalignment preventing layers 142 is increased as the second misalignment preventing layers 142 get closer to the right side of the second area A2 from the center line CL. When the number of the first and second misalignment preventing layers 141 and 142 is increased, the blocking capability of the first and second misalignment preventing layers 141 and 142 may be improved to block the movement of the first and second spacers 331 and 332. Accordingly, the degree of the misalignment between the display substrate 100 and the opposite substrate 300 may be prevented from increasing in the left and right sides of the curved display panel.

The distance between the second misalignment preventing layer 142 and the second spacer 332 is about 5 micrometers before the display panel is bent. Then, when the curved display panel is manufactured, the second misalignment preventing layer 142 is engaged with the second spacer 332 and the alignment between the display substrate 100 and the opposite substrate 300 may be maintained at about 5 micrometers or less by the engaging force between the second misalignment preventing layer 142 and the second spacer 332.

Figure 5C:
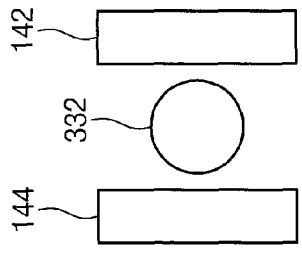
FIG. 5C is a plan view showing a second spacer and second and fourth misalignment preventing layers.
Figure 5A:
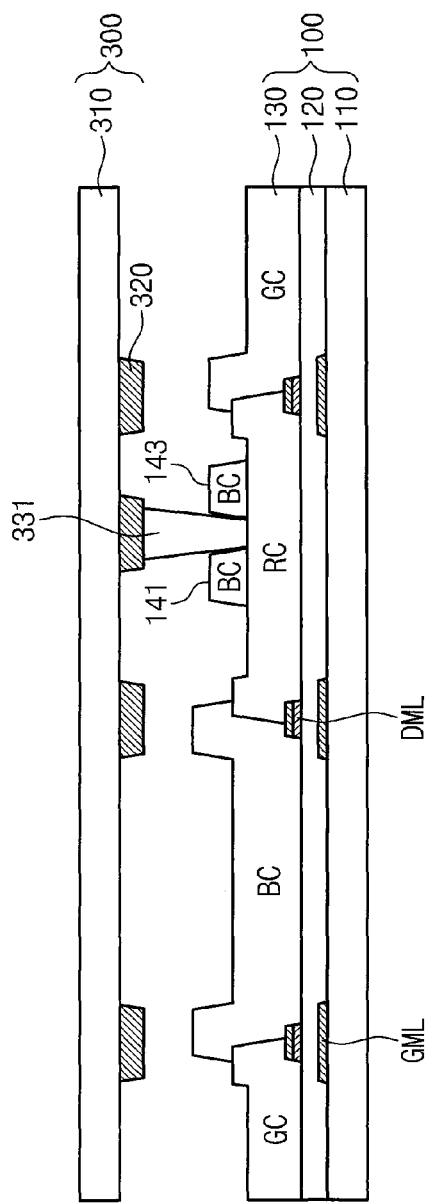
FIG. 5A is a cross-sectional view showing a first area according to an exemplary embodiment of the present disclosure.
Figure 5B:
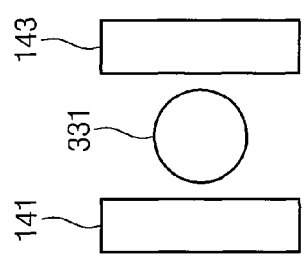
FIG. 5B is a plan view showing a first spacer and first and third misalignment preventing layers.

FIG. 5A is a cross-sectional view showing a first area according to an exemplary embodiment of the present disclosure, FIG. 5B is a plan view showing a first spacer and first and third misalignment preventing layers, and FIG. 5C is a plan view showing a second spacer and second and fourth misalignment preventing layers. In FIG. 5A, the same reference numerals denote the same elements in FIG. 3A, and thus detailed descriptions of the same elements will be omitted.

Referring to FIG. 5A, the color filter layer 130 includes a plurality of color filters RC, GC, and BC. As an example, the color filter layer 130 includes red, green and blue color filters RC, GC, and BC.

The third misalignment preventing layer 143 may be further disposed in the first area A1 of the display substrate 100, which is substantially in parallel to the first misalignment preventing layer 141. The end portion of the first spacer 331 is inserted into between the first and third misalignment preventing layers 141 and 143.

The first and third misalignment preventing layers 141 and 143 are disposed on one of the red, green, and blue color filters RC, GC, and BC. As an example, the first and third misalignment preventing layers 141 and 143 are disposed on the red color filter RC and formed of the blue color filter BC.

When the opposite substrate is coupled to the display substrate 100, the first spacer 331 disposed on the opposite substrate 300 makes contact with the display substrate 100, and thus the opposite substrate 300 is spaced apart from the display substrate 100 by a set or predetermined distance.

The display panel is bent in (along) the first direction D1 after the opposite substrate 300 is coupled to the display substrate 100, so that the display panel curved in (along) the first direction D1 is manufactured.

In this case, one sidewall of the first misalignment preventing layer 141 and one sidewall of the third misalignment preventing layer 143 make contact with the end portion of the first spacer 331. Therefore, the end portion of the first spacer 331 is fixed between the first and third misalignment preventing layers 141 and 143, and thus the first spacer 331 moves within the predetermined range even though the stress is applied to the first spacer 331. Thus, the misalignment between the display substrate 100 and the opposite substrate 300, which is caused by the stress, may be prevented.

As shown in FIG. 5B, the first and third misalignment preventing layers 141 and 143 are disposed at both sides of the first spacer 331 and are symmetrical with each other with respect to an imaginary line passing through the center portion of the first spacer 331 and extending in (along) the second direction D2 (refer to FIG. 2).

As shown in FIG. 5C, the fourth misalignment preventing layer 144 may be further disposed in the second area A2 of the display substrate 100, which is substantially in parallel to the second misalignment preventing layer 142. The end portion of the second spacer 332 is inserted into between the second and fourth misalignment preventing layers 142 and 144. That is, the second and fourth misalignment preventing layers 142 and 144 are disposed at both sides of the second spacer 332 and are symmetrical with each other with respect to an imaginary line passing through the center portion of the second spacer 332 and extending in (along) the second direction D2.

Figure 6A:
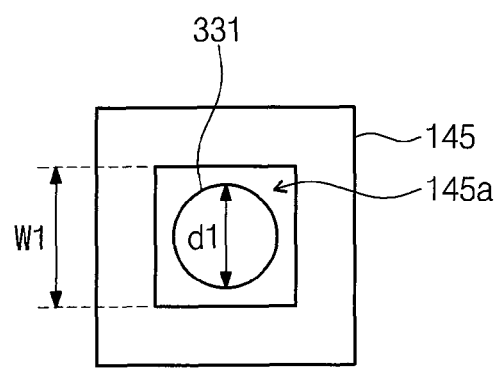
FIG. 6A is a plan view showing a fifth misalignment preventing layer and a first spacer according to an exemplary embodiment of the present disclosure.
Figure 6B:
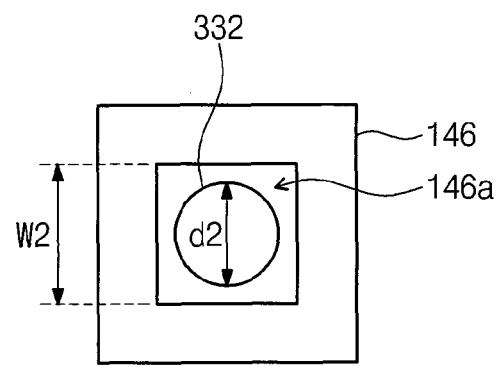
FIG. 6B is a plan view showing a sixth misalignment preventing layer and a second spacer according to an exemplary embodiment of the present disclosure.

FIG. 6A is a plan view showing a fifth misalignment preventing layer and a first spacer according to an exemplary embodiment of the present disclosure, and FIG. 6B is a plan view showing a sixth misalignment preventing layer and a second spacer according to an exemplary embodiment of the present disclosure.

Referring to FIG. 6A, the fifth misalignment preventing layer 145 is disposed on at least one of the red, green, and blue color filters RC, GC, and BC and has a closed loop shape in which a first receiving recess 145a is formed to accommodate the end portion of the first spacer 331. When the fifth misalignment preventing layer 145 is disposed on the red color filter RC, the fifth misalignment preventing layer 145 is formed of one of the green and blue color filters GC and BC or formed by patterning a separate material.

The first receiving recess 145a has a width w1 greater than a diameter d1 of the first spacer 331.

Referring to FIG. 6B, the sixth misalignment preventing layer 146 is disposed on at least one of the red, green, and blue color filters RC, GC, and BC and has a closed loop shape in which a second receiving recess 146a is formed to accommodate the end portion of the second spacer 332. When the sixth misalignment preventing layer 146 is disposed on the red color filter RC, the sixth misalignment preventing layer 146 is formed of one of the green and blue color filters GC and BC or formed by patterning a separate material.

The second receiving recess 146a has a width w2 greater than a diameter d2 of the second spacer 332.

As described above, when the fifth and sixth misalignment preventing layers 145 and 146 have the closed loop shape to respectively surround the first and second spacers 331 and 332, the first and second spacers 331 and 332 are stably held in the first and second areas regardless of the direction in which the curved display panel is curved. Accordingly, the end portions of the first and second spacers 331 and 332 are respectively fixed to the fifth and sixth misalignment preventing layers 145 and 146 and move in the predetermined range even though the stress caused by the bending of the curved display panel is applied thereto. Therefore, the misalignment between the display substrate 100 and the opposite substrate 300, which is caused by the stress, may be prevented.

FIG. 7A is a cross-sectional view showing a first area according to an exemplary embodiment of the present disclosure, and FIG. 7B is a cross-sectional view showing a second area according to an exemplary embodiment of the present disclosure. In FIGS. 7A and 7B, the same reference numerals denote the same elements in FIGS. 3A and 4A, and thus detailed descriptions of the same elements will be omitted.

Referring to FIG. 7A, the first misalignment preventing layer 141 is disposed in the first area A1 of the display substrate 100. The first misalignment preventing layer 141 is protruded from one of the red, green, and blue color filters RC, GC, and BC. As an example, the first misalignment preventing layer 141 is protruded from an upper surface of the red color filter RC and integrally formed with the red color filter RC.

Referring to FIG. 7B, the second misalignment preventing layer 142 is disposed in the second area A2 of the display substrate 100. The second misalignment preventing layer 142 is protruded from one of the red, green, and blue color filters RC, GC, and BC. As an example, the second misalignment preventing layer 142 is protruded from an upper surface of the red color filter RC and integrally formed with the red color filter RC.

Figure 8:
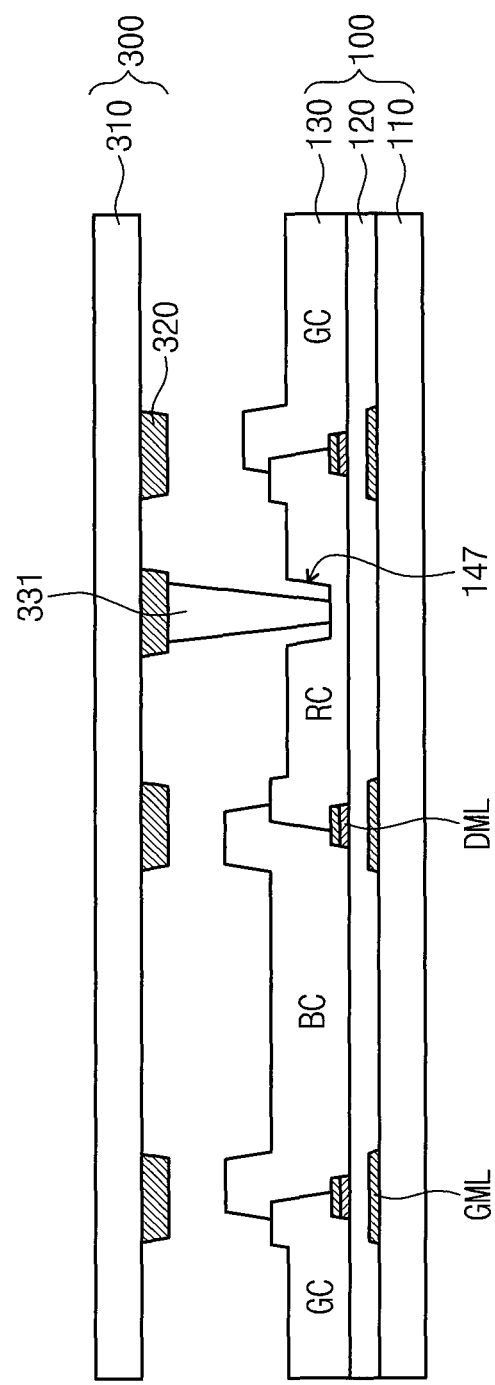
FIG. 8 is a cross-sectional view showing a first area according to an exemplary embodiment of the present disclosure.

FIG. 8 is a cross-sectional view showing a first area according to an exemplary embodiment of the present disclosure.

Referring to FIG. 8, a seventh misalignment preventing layer 147 is disposed in the first area A1 of the display substrate 100. The seventh misalignment preventing layer 147 is formed by recessing a portion of one color filter of the red, green, and blue color filters RC, GC, and BC. As an example, the seventh misalignment preventing layer 147 is recessed downward (into the red color filter RC) from the upper surface of the red color filter RC by a set or predetermined depth and has a rectangular shape when viewed in a plan view. Here, it should be apparent that the spatially relative terms are intended to encompass different orientations of the device in use or operation in addition to the orientation depicted in the figures. For example, if the device in the figures is turned over, "downward" would then be "upward".

As described above, the seventh misalignment preventing layer 147 is formed in the red color filter RC to have the recess shape, and thus the seventh misalignment preventing layer 147 accommodates the end portion of the first spacer 331. Although not shown in FIG. 8, an eighth misalignment preventing layer may be provided to the second area A2 of the display substrate 100 to have the recess shape, so that the eighth misalignment preventing layer may accommodate the end portion of the second spacer 332.

The end portions of the first and second spacers 331 and 332, which are respectively accommodated in the seventh misalignment preventing layer 147 and the eighth misalignment preventing layer, are guided by the sidewall of the red color filter RC, which defines the recess, and thus the misalignment between the display substrate 100 and the opposite substrate 300, which is caused by the stress, may be prevented.

FIG. 9A is a cross-sectional view showing a first area according to an exemplary embodiment of the present disclosure, and FIG. 9B is a cross-sectional view showing a second area according to an exemplary embodiment of the present disclosure.

Referring to FIG. 9A, a display substrate 100 includes a first base substrate 110, a gate metal layer GML disposed on the first base substrate 110, a gate insulating layer 120 covering the gate metal layer GML, a data metal layer DML disposed on the gate insulating layer GML, and an organic insulating layer 150 covering the data metal layer DML.

The organic insulating layer 150 includes a transparent organic insulating material, e.g., an acrylic-based resin.

A ninth misalignment preventing layer 161 is disposed in the first area A1 of the display substrate 100. The ninth misalignment preventing layer 161 is protruded from an upper surface of the organic insulating layer 150 toward the opposite substrate 300. That is, the ninth misalignment preventing layer 161 is integrally formed with the organic insulating layer 150.

The opposite substrate 300 includes a second base substrate 310 facing the first base substrate 110, a black matrix 320 disposed on the second base substrate 310, a color filter layer 340 disposed to overlap with the black matrix 320, and a first spacer 331 disposed on the color filter layer 340.

The color filter layer 340 includes red, green, and blue color filters RC, GC, and BC. The first spacer 331 is disposed on at least one of the red, green, and blue color filters RC, GC, and BC. As an example, the first spacer 331 is disposed on the red color filter RC.

One sidewall of the ninth misalignment preventing layer 161 makes contact with an end portion of the first spacer 331. Here, a stress applied to the curved display panel, which is caused by the bending of the display panel, may be blocked by an engaging force between the ninth misalignment preventing layer 161 and the first spacer 331. Accordingly, the misalignment between the display substrate 100 and the opposite substrate 300, which is caused by the stress, may be prevented.

Referring to FIG. 9B, a tenth misalignment preventing layer 162 is disposed in the second area A2 of the display substrate 100. The tenth misalignment preventing layer 162 is protruded from the upper surface of the organic insulating layer 150 toward the opposite substrate 300. That is, the tenth misalignment preventing layer 162 is integrally formed with the organic insulating layer 150.

The opposite substrate 300 includes a second spacer 332 disposed on at least one of the red, green, and blue color filters RC, GC, and BC. As an example, the second spacer 332 is disposed on the red color filter RC.

One sidewall of the tenth misalignment preventing layer 162 makes contact with an end portion of the second spacer 332. Here, a stress applied to the curved display panel, which is caused by the bending of the display panel, may be blocked by an engaging force between the tenth misalignment preventing layer 162 and the second spacer 332. Therefore, the misalignment between the display substrate 100 and the opposite substrate 300, which is caused by the stress, may be prevented.

Figure 10:
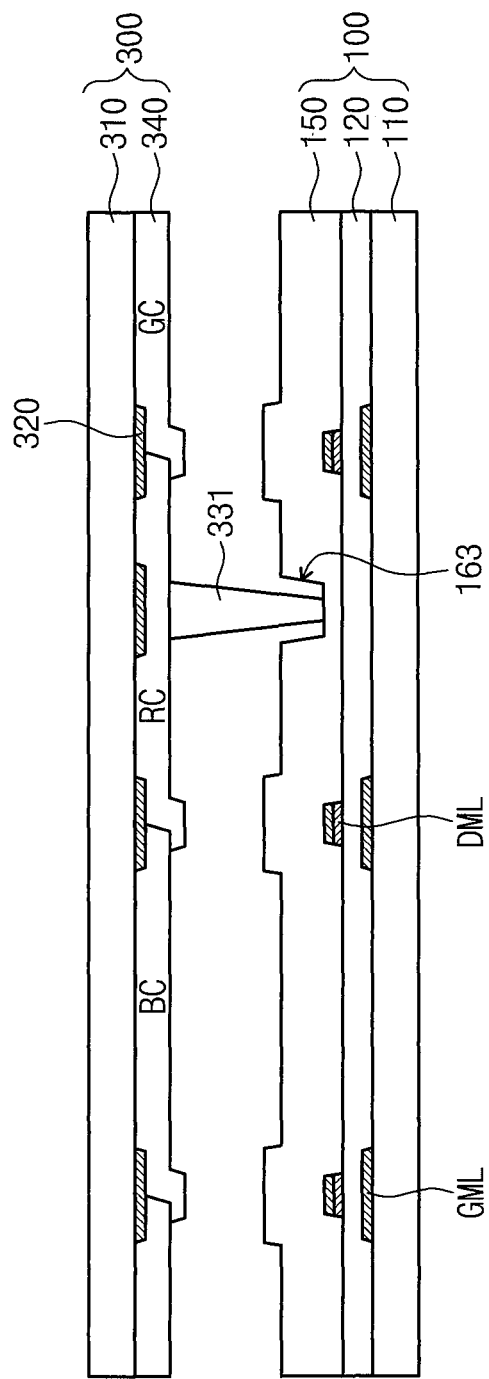
FIG. 10 is a cross-sectional view showing a first area according to an exemplary embodiment of the present disclosure.

FIG. 10 is a cross-sectional view showing a first area according to an exemplary embodiment of the present disclosure. In FIG. 10, the same reference numerals denote the same elements in FIG. 9A, and thus detailed descriptions of the same elements will be omitted.

Referring to FIG. 10, an eleventh misalignment preventing layer 163 is disposed in the first area A1 of the display substrate 100. The eleventh misalignment preventing layer 163 is recessed in the organic insulating layer 150 to have a concave pattern. As an example, the eleventh misalignment preventing layer 163 is recessed downward from the upper surface of the organic insulating layer 150 by a set or predetermined depth and has a rectangular shape when viewed in a plan view.

As described above, the eleventh misalignment preventing layer 163 is formed in the organic insulating layer 150 to have the recess shape, and thus the eleventh misalignment preventing layer 163 accommodates the end portion of the first spacer 331. Although not shown in FIG. 10, a twelfth misalignment preventing layer may be provided to the second area A2 of the display substrate 100 to have the recess shape, so that the twelfth misalignment preventing layer may accommodate the end portion of the second spacer 332.

The end portions of the first and second spacers 331 and 332, which are respectively accommodated in the eleventh misalignment preventing layer 163 and the twelfth misalignment preventing layer, are guided by the sidewall of the organic insulating layer 150, which defines the recess, and thus the misalignment between the display substrate 100 and the opposite substrate 300, which is caused by the stress, may be prevented.

FIGS. 11A to 11C are cross-sectional views showing a manufacturing method of a display substrate according to an exemplary embodiment of the present disclosure.

Referring to FIG. 11A, the gate metal layer GML is disposed on the first base substrate 110, the gate insulating layer 120 is formed on the first base substrate 110 to cover the gate metal layer GML, and the data metal layer DML is formed on the gate insulating layer GML. The data metal layer DML may have a double-layer structure.

One of the red, green, and blue color filters RC, GC, and BC, e.g., the red color filter RC, is formed on the data metal layer DML and the gate insulating layer 120.

Referring to FIG. 11B, another one of the red, green, and blue color filters RC, GC, and BC, e.g., the green color filter GC, is formed on the data metal layer DML and the gate insulating layer 120. The green color filter GC is partially overlapped with the red color filter RC in a boundary of the pixel area.

Referring to FIG. 11C, the other one of the red, green, and blue color filters RC, GC, and BC, e.g., the blue color filter BC, is formed on the data metal layer DML and the gate insulating layer 120, and thus the color filter layer 130 is completed. The blue color filter BC is partially overlapped with the red and green color filters RC and GC in the boundary of the pixel area.

In addition, the blue color filter BC is formed on the red color filter RC to form the first misalignment preventing layer 141.

In one embodiment, the second misalignment preventing layer 142 may be substantially and simultaneously formed with the first misalignment preventing layer 141 through the same process.

As described above, the first and second misalignment preventing layers 141 and 142 are formed together with the color filters RC, GC, and BC without performing additional processes, and thus the number of the manufacturing processes of the display substrate may be prevented from being increased.

Figure 12A:
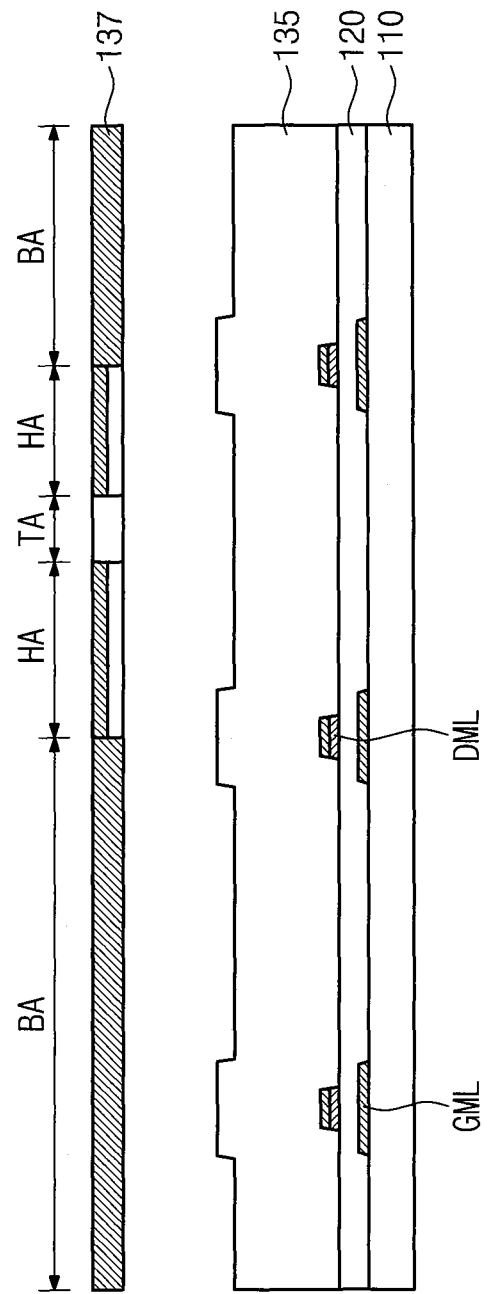

FIGS. 12A to 12C are cross-sectional views showing a manufacturing method of a display substrate according to an exemplary embodiment of the present disclosure.

Referring to FIG. 12A, the gate metal layer GML is disposed on the first base substrate 110, the gate insulating layer 120 is formed on the first base substrate 110 to cover the gate metal layer GML, and the data metal layer DML is formed on the gate insulating layer GML. The data metal layer DML may have a double-layer structure.

A red insulating layer 135 is formed on the data metal layer DML and the gate insulating layer 120. A first mask 137 is disposed on the red insulating layer 135, and then an exposure process is performed. Although not shown in figures, a negative type (kind) photoresist layer is formed on the red insulating layer 135 and the photoresist layer is exposed using (utilizing) the first mask 137. The first mask 137 includes a transmission area TA in which the photoresist layer is fully exposed, a half area HA in which the photoresist layer is half-exposed, and a blocking area BA in which the photoresist layer is not exposed.

Since the photoresist layer is the negative type, the non-exposed portion of the photoresist layer is completely removed and the half-exposed portion of the photoresist layer is partially removed after a development process is performed, thereby forming a photoresist pattern. The red insulating layer 135 is etched using (utilizing) the photoresist pattern as a mask. Due to the etching process, the red insulating layer 135 is completely removed in the blocking area BA, the red insulating layer 135 is partially removed in the half area HA, and the red insulating layer 135 remains in the transmission area TA without being removed. Accordingly, the red color filter RC and the first misalignment preventing layer 141 are formed as shown in FIG. 12B.

The first misalignment preventing layer 141 is formed to correspond to the transmission area TA and protruded from an upper surface of the red color filter RC.

Referring to FIG. 12C, the green and blue color filters GC and BC are sequentially formed on the data metal layer DML and the gate insulating layer 120, and thus the color filter layer 130 is completed.

Figure 13A:
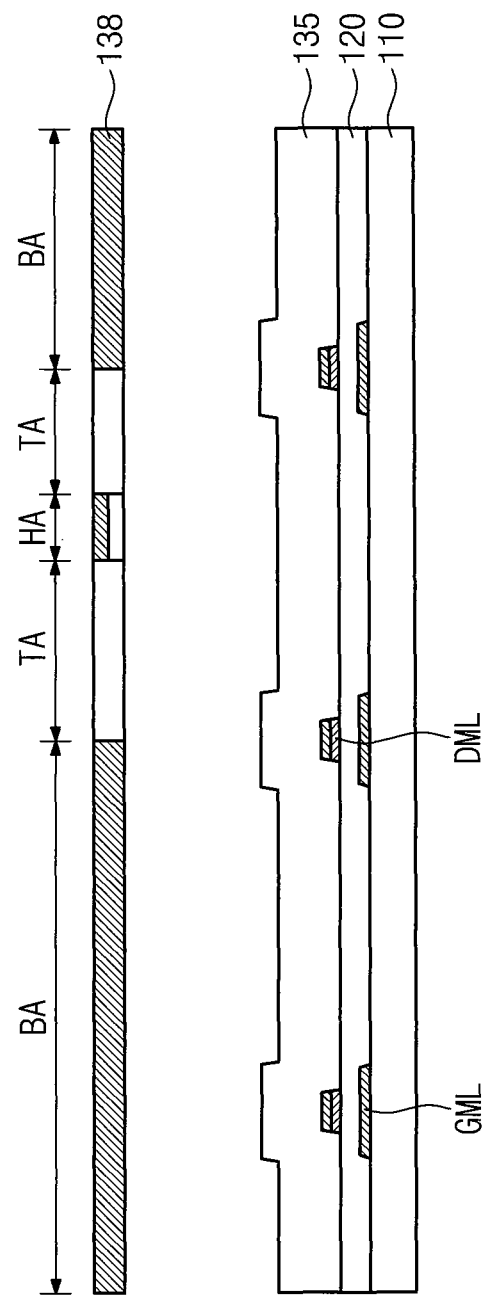

FIGS. 13A to 13C are cross-sectional views showing a manufacturing method of a display substrate according to an exemplary embodiment of the present disclosure.

Referring to FIG. 13A, a red insulating layer 135 is formed on the data metal layer DML and the gate insulating layer 120. A second mask 138 is disposed on the red insulating layer 135, and then an exposure process is performed. Although not shown in figures, a negative type (kind) photoresist layer is formed on the red insulating layer 135 and the photoresist layer is exposed using (utilizing) the second mask 138. The second mask 138 includes a transmission area TA in which the photoresist layer is fully exposed, a half area HA in which the photoresist layer is half-exposed, and a blocking area BA in which the photoresist layer is not exposed.

Since the photoresist layer is the negative type, the non-exposed portion of the photoresist layer is completely removed and the half-exposed portion of the photoresist layer is partially removed after a development process is performed, thereby forming a photoresist pattern. The red insulating layer 135 is etched using (utilizing) the photoresist pattern as a mask. Due to the etching process, the red insulating layer 135 is completely removed in the blocking area BA, the red insulating layer 135 is partially removed in the half area HA, and the red insulating layer 135 remains in the transmission area TA without being removed. Therefore, the red color filter RC and the seventh misalignment preventing layer 147 are formed as shown in FIG. 13B.

The seventh misalignment preventing layer 147 is formed to correspond to the half area HA. In more detail, the seventh misalignment preventing layer 147 is formed of the red color filter RC and recessed downward from the upper surface of the red color filter RC to have the concave pattern.

Referring to FIG. 13C, the green and blue color filters GC and BC are sequentially formed on the data metal layer DML and the gate insulating layer 120, and thus the color filter layer 130 is completed.

Figure 14:
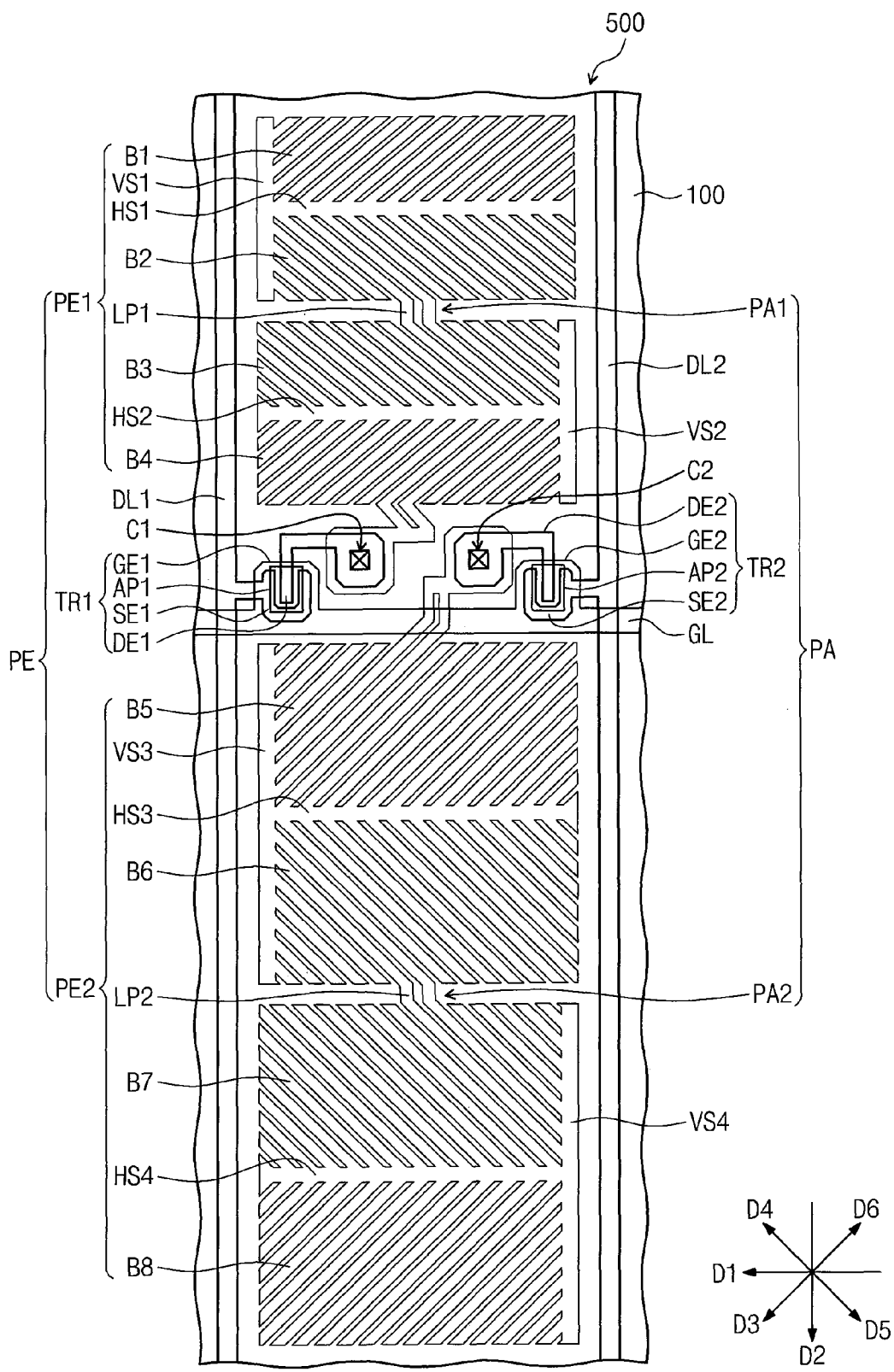
FIG. 14 is a plan view showing a pixel disposed on a display substrate according to an exemplary embodiment of the present disclosure.

FIG. 14 is a plan view showing a pixel disposed on a display substrate according to an exemplary embodiment of the present disclosure, and FIG. 15 is a view showing domains defined in a pixel area and liquid crystal alignment directions.

The display device 500 includes the pixels, but only one pixel area in which one pixel is disposed among the pixels has been shown in FIG. 14.

Referring to FIG. 14, a pixel includes a gate line GL, a first data line DL1, a second data line DL2, a first thin film transistor TR1, a second thin film transistor TR2, and a pixel electrode PE.

The gate line GL is electrically connected to the first and second thin film transistors TR1 and TR2 and applies a gate signal to the first and second thin film transistors TR1 and TR2.

When an area in which the pixel electrode PE is disposed is referred to as a pixel area PA, the pixel area PA includes a first sub-pixel area PA1 and a second sub-pixel area PA2. In this case, the pixel electrode PE includes a first sub-pixel electrode PE1 disposed in the first sub-pixel area PA1 and a second sub-pixel electrode PE2 disposed in the second sub-pixel area PA2.

The first data line DL1 applies a first data signal to the first thin film transistor TR1, and the second data line DL2 applies a second data signal to the second thin film transistor TR2. In the present exemplary embodiment, the first data line DL1 extends along one side of the first and second sub-pixel electrodes PE1 and PE2 and the second data line DL2 extends along the other side of the first and second sub-pixel electrodes PE1 and PE2. Accordingly, the first and second sub-pixel electrodes PE1 and PE2 are disposed between the first and second data lines DL1 and DL2.

The first thin film transistor TR1 is electrically connected to the gate line GL, the first data line DL1, and the first sub-pixel electrode PE1. Therefore, when the first thin film transistor TR1 is turned on in response to the gate signal, the first data signal is applied to the first sub-pixel electrode PE1.

The first thin film transistor TR1 includes a first gate electrode GE1, a first active pattern AP1, a first source electrode SE1, and a first drain electrode DE1. The first gate electrode GE1 is branched from the gate line GL. The first source electrode SE1 is branched from the first data line DL1 and makes contact with the first active pattern AP1, and the first drain electrode DE1 is spaced apart from the first source electrode SE1 and makes contact with the first active pattern AP1.

The first sub-pixel electrode PE1 makes contact with the first drain electrode DE1 through a first contact hole C1.

The second thin film transistor TR2 is electrically connected to the gate line GL, the second data line DL2, and the second sub-pixel electrode PE2. Thus, when the second thin film transistor TR2 is turned on in response to the gate signal, the second data signal is applied to the second sub-pixel electrode PE2.

The second thin film transistor TR2 includes a second gate electrode GE2, a second active pattern AP2, a second source electrode SE2, and a second drain electrode DE2. The second gate electrode GE2 is branched from the gate line GL and the second active pattern AP2 is disposed on the second gate electrode GE2 such that the first insulating layer L1 is disposed between the second gate electrode GE2 and the second active pattern AP2. The second source electrode SE2 is branched from the second data line DL2 and makes contact with the second active pattern AP2, and the second drain electrode DE2 is spaced apart from the second source electrode SE2 and makes contact with the second active pattern AP2.

The second sub-pixel electrode PE2 makes contact with the second drain electrode DE2 through a second contact hole C2.

As described above, the first and second sub-pixel electrodes PE1 and PE2 are driven by different data signals, and thus different grayscales are displayed in the first and second sub-pixel areas PA1 and PA2, respectively.

Referring to FIGS. 14 and 15, the first sub-pixel electrode PE1 includes a first horizontal trunk portion HS1, a second horizontal trunk portion HS2, a first vertical trunk portion VS1, a second vertical trunk portion VS2, and first, second, third, and fourth branch portions B1, B2, B3, and B4.

The first vertical trunk portion VS1 is connected to the first horizontal trunk portion HS1, edges of the first branch portions B1, and edges of the second branch portions B2, and the second vertical trunk portion VS2 is connected to the second horizontal trunk portion HS2, edges of the third branch portions B3, and edges of the fourth branch portions B4. In the present exemplary embodiment, each of the first and second vertical trunk portions VS1 and VS2 extends in a second direction D2 crossing a first direction D1 in which the liquid crystal display device 500 is curved. In more detail, the second direction D2 is substantially perpendicular to the first direction D1 when viewed in a plan view.

The first horizontal trunk portion HS1 is connected to the first vertical trunk portion VS1, edges of the first branch portions B1, and edges of the second branch portions B2. In the present exemplary embodiment, the first horizontal trunk portion HS1 extends in the first direction D1 and is branched from a center portion of the first vertical trunk portion VS1. The first branch portions B1 are symmetrical with the second branch portions B2 with respect to the first horizontal trunk portion HS1, and the first horizontal trunk portion HS1 is disposed between first and second domains DM1 and DM2.

The second horizontal trunk portion HS2 is connected to the second vertical trunk portion VS2, edges of the third branch portions B3, and edges of the fourth branch portions B4. In the present exemplary embodiment, the second horizontal trunk portion HS2 extends in (along) the first direction D1 and is branched from a center portion of the second vertical trunk portion VS2. The third branch portions B3 are symmetrical with the fourth branch portions B4 with respect to the second horizontal trunk portion HS2, and the second horizontal trunk portion HS2 is disposed between third and fourth domains DM3 and DM4.

Portions of the first branch portions B1 are branched from the first horizontal trunk portion HS1, and the other portions of the first branch portions B1 are branched from the first vertical trunk portion VS1. In addition, each of the first branch portions B1 extends in (along) a third direction D3 inclined with respect to the first direction D1 and the second direction D2 when viewed in a plan view, and the first branch portions B1 are spaced apart from each other.

Portions of the second branch portions B2 are branched from the first horizontal trunk portion HS1, and the other portions of the second branch portions B2 are branched from the first vertical trunk portion VS1. In addition, each of the second branch portions B2 extends in (along) a fourth direction D4 inclined with respect to the first and second directions D1 and D2 when viewed in a plan view, and the second branch portions B2 are spaced apart from each other.

When viewed in a plan view, the fourth direction D4 may cross the third direction D3. For instance, the third direction D3 may be substantially perpendicular to the fourth direction D4, and each of the third and fourth directions D3 and D4 may form an angle of about 45 degrees with respect to the first direction D1 or the second direction D2.

Portions of the third branch portions B3 are branched from the second horizontal trunk portion HS2, and the other portions of the third branch portions B3 are branched from the second vertical trunk portion VS2. In addition, each of the third branch portions B3 extends in (along) a fifth direction D5 inclined with respect to the first direction D1 and the second direction D2 when viewed in a plan view, and the third branch portions B3 are spaced apart from each other.

Portions of the fourth branch portions B4 are branched from the second horizontal trunk portion HS2, and the other portions of the fourth branch portions B4 are branched from the second vertical trunk portion VS2. In addition, each of the fourth branch portions B4 extends in (along) a sixth direction D6 inclined with respect to the first direction D1 and the second direction D2 when viewed in a plan view, and the fourth branch portions B4 are spaced apart from each other.

When viewed in a plan view, the sixth direction D6 may cross the fifth direction D5. For instance, the fifth direction D5 may be substantially perpendicular to the sixth direction D6, and each of the fifth and sixth directions D5 and D6 may form an angle of about 45 degrees with respect to the first direction D1 or the second direction D2.

The second sub-pixel electrode PE2 may have a size different from that of the first sub-pixel electrode PE1, however, the second sub-pixel electrode PE2 may instead have a shape similar to that of the first sub-pixel electrode PE1.

The second sub-pixel electrode PE2 includes a third horizontal trunk portion HS3, a fourth horizontal trunk portion HS4, a third vertical trunk portion VS3, a fourth vertical trunk portion VS4, and fifth to eighth branch portions B5, B6, B7, and B8.

The third vertical trunk portion VS3 extends in (along) the second direction D2 and is connected to the third horizontal trunk portion HS3, edges of the fifth branch portions B5, and edges of the sixth branch portions B6. The fourth vertical trunk portion VS4 extends in (along) the second direction D2 and is connected to the fourth vertical trunk portion HS4, edges of the seventh branch portions B7, and edges of the eighth branch portions B8.

The third horizontal trunk portion HS3 is branched from the third vertical trunk portion VS3 and extends in (along) the first direction D1, and the fourth horizontal trunk portion HS4 is branched from the fourth vertical trunk portion VS4 and extends in (along) the first direction D1. In the present exemplary embodiment, the third horizontal trunk portion HS3 is branched from a center portion of the third vertical trunk portion VS3 and the fourth horizontal trunk portion HS4 is branched from a center portion of the fourth vertical trunk portion VS4.

Portions of the fifth branch portions B5 are branched from the third horizontal trunk portion HS3, and the other portions of the fifth branch portions B5 are branched from the third vertical trunk portion VS3. In addition, each of the fifth branch portions B5 extends in (along) the third direction D3 when viewed in a plan view, and the fifth branch portions B5 are spaced apart from each other.

Portions of the sixth branch portions B6 are branched from the third horizontal trunk portion HS3, and the other portions of the sixth branch portions B6 are branched from the third vertical trunk portion VS3. In addition, each of the sixth branch portions B6 extends in (along) the fourth direction D4 when viewed in a plan view, and the sixth branch portions B6 are spaced apart from each other.

Portions of the seventh branch portions B7 are branched from the fourth horizontal trunk portion HS4, and the other portions of the seventh branch portions B7 are branched from the fourth vertical trunk portion VS4. In addition, each of the seventh branch portions B7 extends in (along) the fifth direction D5 when viewed in a plan view, and the seventh branch portions B7 are spaced apart from each other.

Portions of the eighth branch portions B8 are branched from the fourth horizontal trunk portion HS4, and the other portions of the eighth branch portions B8 are branched from the fourth vertical trunk portion VS4. In addition, each of the eighth branch portions B8 extends in (along) the sixth direction D6 when viewed in a plan view, and the eighth branch portions B8 are spaced apart from each other.

As shown in FIG. 15, the first to fourth domains DM1 to DM4 are defined in the first sub-pixel area PA1, and fifth to eighth domains DM5 to DM8 are defined in the second sub-pixel area PA2.

Also, in the case that the first to eighth domains DM1 to DM8 are defined in the first and second sub-pixel areas PA1 and PA2, the first sub-pixel electrode PE1 further includes a first domain connection part LP1 and the second sub-pixel electrode PE2 further includes a second domain connection part LP2.

The first domain connection part LP1 is disposed between the second domain DM2 and the third domain DM3 to connect the second branch portions B2 and the third branch portions B3, and the second domain connection part LP2 is disposed between the sixth domain DM6 and the seventh domain DM7 to connect the sixth branch portions B6 and the seventh branch portions B7. The first domain connection part LP1 may be disposed at a center of a border area between the second domain DM2 and the third domain DM3, and the second domain connection part LP2 may be disposed at a center of a border area between the sixth domain DM6 and the seventh domain DM7.

When an area in which the liquid crystal molecules are aligned by the first branch portions B1 is referred to as the first domain DM1, a first liquid crystal alignment direction DR1 in the first domain DM1 corresponds to the third direction D3. When an area in which the liquid crystal molecules are aligned by the second branch portions B2 is referred to as the second domain DM2, a second liquid crystal alignment direction DR2 in the second domain DM2 corresponds to the fourth direction D4.

A third liquid crystal alignment direction DR3 in the third domain DM3 corresponds to the fifth direction D5, and a fourth liquid crystal alignment direction DR4 in the fourth domain DM4 corresponds to the sixth direction D6.

According to the above, the first to fourth domains DM1 to DM4, which are sequentially arranged in the second direction D2, are formed in the first sub-pixel area PA1, and the liquid crystal alignment directions in the first to fourth domains DM1 to DM4 are different from each other. Thus, a viewing angle of the first sub-pixel area PA1 may be widened.

In addition, the fifth to eighth domains DM5 to DM8, which are sequentially arranged in the second direction D2, are formed in the second sub-pixel area PA2, and the liquid crystal alignment directions in the fifth to eighth domains DM5 to DM8 are different from each other. Thus, a viewing angle of the second sub-pixel area PA2 may be widened.

The first to eighth domains DM1 to DM8 are arranged in the second direction D2 in one pixel. Therefore, the domains having different liquid crystal alignment directions are prevented from being overlapped with each other due to a misalignment occurring in the curved display device 500 curved in the first direction D1, thereby preventing a texture defect caused by the misalignment of the liquid crystal molecules.

Although the exemplary embodiments of the present invention have been described, it is understood that the present invention should not be limited to these exemplary embodiments but various changes and modifications can be made by a person having ordinary skilled in the art within the spirit and scope of the present invention as hereinafter claimed and equivalents thereof.

What is claimed is:

1. A display device comprising:
a display substrate with a pixel and being curved along a first direction;
an opposite substrate facing the display substrate, being coupled to the display substrate, and curved with the display substrate;
a column spacer between the display substrate and the opposite substrate to maintain a gap between the display substrate and the opposite substrate and including first and second spacers respectively disposed at left and right sides of a center line passing through a center portion of the display substrate along a second direction substantially normal to the first direction;
a first misalignment preventing layer at a left side of the first spacer with respect to the center line; and
a second misalignment preventing layer at a right side of the second spacer with respect to the center line.

2. The display device of claim 1, wherein the column spacer is on the opposite substrate, and each of the first and second misalignment preventing layers comprises a pattern formed of a layer on the display substrate.

3. The display device of claim 2, wherein the display substrate further comprises a base insulating layer, and the first and second misalignment preventing layers are protruded from an upper surface of the base insulating layer.

4. The display device of claim 3, further comprising:
a third misalignment preventing layer at a right side of the first spacer to be substantially in parallel to the first misalignment preventing layer with respect to the center line; and
a fourth misalignment preventing layer at a left side of the second spacer to be substantially in parallel to the second misalignment preventing layer with respect to the center line.

5. The display device of claim 3, wherein the first misalignment preventing layer comprises a first protrusion pattern having a closed loop shape in which a first receiving recess is formed to accommodate the first spacer, and the second misalignment preventing layer comprises a second protrusion pattern having a closed loop shape in which a second receiving recess is formed to accommodate the second spacer.

6. The display device of claim 3, wherein the base insulating layer is a color filter layer including a plurality of color filters, and the first and second misalignment preventing layers are on a first color filter of the color filters.

7. The display device of claim 6, wherein each of the first and second misalignment preventing layers comprises a second color filter different from the first color filter, is disposed on the first color filter, and has a bar shape.

8. The display device of claim 6, wherein each of the first and second misalignment preventing layers has a same color as the first color filter and is protruded from the first color filter to have a bar shape.

9. The display device of claim 6, wherein each of the first and second misalignment preventing layers comprises a concave pattern recessed downward from an upper surface of the first color filter.

10. The display device of claim 3, wherein the base insulating layer is an organic insulating layer, and each of the first and second misalignment preventing layers comprises a protrusion pattern protruded from the organic insulating layer.

11. The display device of claim 3, wherein the base insulating layer is an organic insulating layer, and each of the first and second misalignment preventing layers comprises a concave pattern recessed downward from an upper surface of the organic insulating layer.

12. The display device of claim 11, wherein a density of the first and second misalignment preventing layers is increased as a distance from the center line increases along the first direction.

13. A method of manufacturing a display device, the method comprising:
   forming a display substrate with a pixel disposed thereon;
   forming an opposite substrate including a column spacer;
   coupling the display substrate to the opposite substrate such that the column spacer is disposed between the display substrate and the opposite substrate to complete a display panel; and
   bending the display panel in a first direction to complete a curved display device, wherein the column spacer comprises first and second spacers respectively disposed at left and right sides of a center line passing through a center portion of the display substrate along a second direction substantially normal to the first direction, and the forming of the display substrate comprises forming a first misalignment preventing layer disposed at a left side of the first spacer with respect to the center line and a second misalignment preventing layer disposed at a right side of the second spacer with respect to the center line.

14. The method of claim 13, wherein the forming of the display substrate comprises:
   forming a first color filter; and
   forming a second color filter on the first color filter to form the first and second misalignment preventing layers.

15. The method of claim 13, wherein the forming of the display substrate comprises:
   forming an insulating material;
   forming a photoresist layer on the insulating material;
   performing an exposure process on the photoresist layer to pattern the photoresist layer; and
   patterning the insulating material utilizing the patterned photoresist layer to form a base insulating layer and the first and second misalignment preventing layers.

16. The method of claim 15, wherein the first and second misalignment preventing layers comprise a protrusion pattern protruded from the base insulating layer.

17. The method of claim 15, wherein each of the first and second misalignment preventing layers comprises a concave pattern recessed downward from an upper surface of the base insulating layer.

18. The method of claim 15, wherein the base insulating layer is a color filter layer.

19. The method of claim 15, wherein the base insulating layer is an organic insulating layer.

20. The method of claim 13, wherein each of a distance between the first misalignment preventing layer and the first spacer and a distance between the second misalignment preventing layer and the second spacer is equal to or smaller than about 5 micrometers.

* * * * *